May 10, 1932.  A. BROWN  1,857,426

DEMOUNTABLE RIM

Filed April 30, 1931

Inventor:
Aaron Brown
By Fred Gerlach
his Atty

Patented May 10, 1932

1,857,426

UNITED STATES PATENT OFFICE

AARON BROWN, OF CHICAGO, ILLINOIS

DEMOUNTABLE RIM

Application filed April 30, 1931. Serial No. 533,956.

The invention relates generally to demountable rims for vehicle wheels. More particularly, the invention relates to that type of demountable rim which is adapted for use in connection with a pneumatic tire and comprises (1) a main section which is provided with outwardly extending side flanges for tire-holding purposes and is greater than one-half of the circumference of the rim; and (2) a complemental section which is also provided with tire-holding side flanges and is movably connected to one end of the main section so that it may be shifted inwardly in order to facilitate application and removal of the tire.

One object of the invention is to provide a demountable rim of the aforementioned type which is an improvement upon previously designed rims of like character by virtue of the fact that the movable connection between the two sections permits the complemental rim section to be removed or detached bodily from the main section and thus makes it possible to effect application and removal of the tire more readily than in constructions wherein the complemental section is attached permanently to the main section such, for example, as by a pivotal connection.

Another object of the invention is to provide a demountable rim of the type under consideration in which the connection between the sections comprises a pair of laterally spaced tongues which project outwardly from one end of one of the sections and are adapted to interfit with notched or recessed portions in the contiguous end of the other section.

A further object of the invention is to provide a demountable rim of the collapsible or sectional type which is generally of new and improved construction and may be manufactured at a low and reasonable cost.

Other objects of the invention and the various advantages and characteristics of the present rim construction will be apparent from a consideration of the following detailed description.

The invention consists in the several novel features hereinafter set forth and more particularly defined by the claims at the conclusion hereof.

In the drawings which accompany and form a part of this specification or disclosure and in which like numerals of reference denote corresponding parts throughout the several views.

Figure 1:
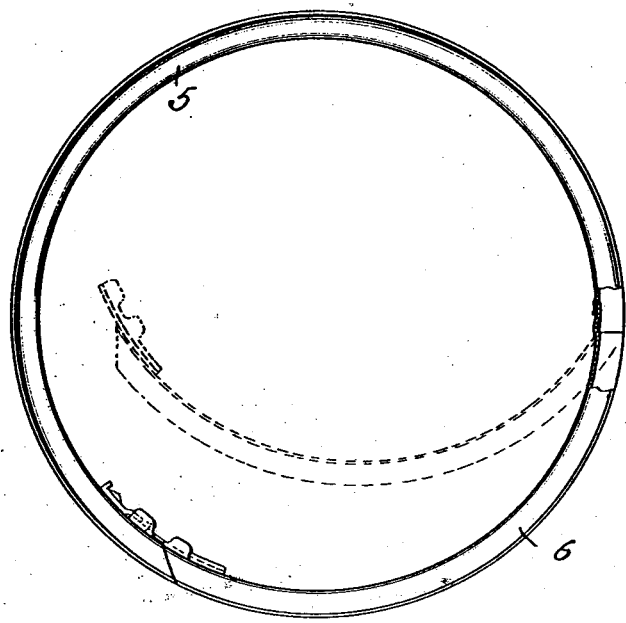
Fig. 1 is a side elevation of a rim embodying the invention.
Figure 2:
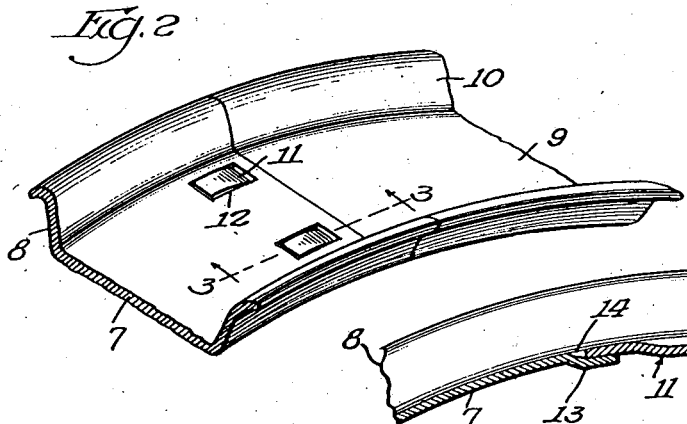
Fig. 2 is a fragmentary perspective view illustrating in detail the construction of the movable connection between the complemental section and the main rim section.

The demountable rim which forms the subject matter of the present invention is adapted for use with a pneumatic tire and is designed to fit around the felly of a vehicle wheel. It comprises a main section 5 and a complemental section 6. The main section 5 is greater than one-half of the circumference of the rim, as illustrated in Fig. 1, and consists of an arcuate base 7 and a pair of radially extending side flanges 8. The side flanges 8 are formed integrally with and project outwardly from the side margins of the arcuate base 7 and are adapted to lap the side parts of the casing of the tire with which the rim is used. The complemental section 6 is adapted to fit between the ends of the main section 5 and consists of an arcuate base 9 and a pair of side flanges 10. The base 9 is substantially the same in width as the base of the main section 5 and is finished or constructed so that the ends thereof abut against the end edges of the base of the main section when the complemental section is in its operative position. The side flanges 10 are formed integrally with and project outwardly from the base 9 and serve in conjunction with the side flanges of the main rim section to hold the tire in place.

Figure 3:
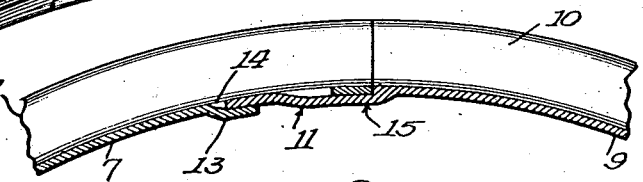
Fig. 3 is a longitudinal sectional view of one of the tongue and notch connections between the two sections of the rim.
Figure 4:
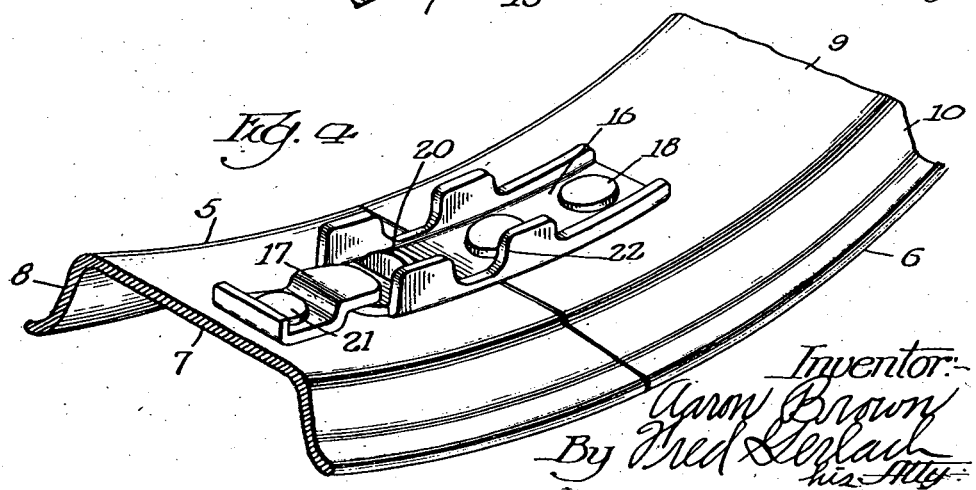
Fig. 4 is a fragmentary perspective of the device for locking the rim sections in their normal or operative positions.

One end of the complemental section 6 is detachably connected are formed integrally with and project outwardly from the base 9 of the rim section 6 and are positioned in laterally spaced relation and near the side flanges 10. The base 7 of the main rim section 5 is formed with a pair of rectangular openings 12 in the part thereof that adjoins the tongues 11. The openings 12 are spaced inwardly from the end edge of the base 7 and are arranged so that the tongues may pass therethrough as indicated in Fig. 3 of the drawings. The portions of the base 7 that define the inner ends of the openings 12 are struck downwardly, as at 13, to form open-ended sockets 14. The latter are adapted to receive the outer or distal ends of the tongues 11 and cooperate with the tongues to form a detachable connection between the complemental rim section 6 and the main rim section 5. An advantage and characteristic of utilizing the tongue and socket connections between the complemental rim section and the main rim section is that the complemental rim section may be bodily removed or detached from the main section during application and removal of the tire. The central and inner end portions of the tongues 11 are deflected downwardly, as at 15, so as to underlie the portions of the base 7 that are between the end edge of the base and the outer ends of the rectangular openings 12. The downstruck portions of the base 7 are preferably formed so that the sockets 14 are equal in depth or thickness to the tongues 11. As a result of this arrangement, the outer faces of the end parts of the tongues 11 are substantially flush with the outer face of the base 7 of the main rim section 5 and hence do not abrade or injure the casing or tube of pneumatic tire. The downwardly deflected central and inner end parts of the tongues 11 the main rim section 5. The portions of the base 7 to prevent outward displacement of the supplemental rim section 6 relatively to the main rim section 5. The portions of the base 7 that define the sides of the sockets 14 fit against the side edges of the tongues 11 and prevent transverse or lateral displacement of the complemental rim section relatively to the main section. In connecting the complemental rim section 6 to the main rim section 5, the tongues 11 are shifted through the openings 12 into the sockets 14. Upon insertion of the outer or distal ends of the tongues 11 into the sockets 14, a connection is effected whereby the complemental rim section is held against displacement relatively to the rim section 5.

The end of the complemental rim section 6 that is opposite the tongues 11 is locked to the contiguous or adjoining end of the main rim section 5 by means of a lock plate 16 and a latch 17. The lock plate 16 is connected by rivets 18 to the underface of the base 9 of the rim section 6, and is arranged so that the outer end thereof projects outwardly from the rim section 6 and fits against the inner face of the base 7 of the main rim section. The extreme outer end of the plate 6 is provided with a slot 19 for receiving an inwardly extending stud 20 on the contiguous portion of the base 7. The latch member 17 is pivotally connected to the main rim section 5 by means of a rivet 21 and is adapted to be swung into lapped relation with the outer end of the lock plate 16 in order to lock the complemental rim section 6 in its operative position. The side margins of the lock plate 16 are bent so that they extend inwardly and have notches 22 for receiving a bolt or similar driving element on the felly of the wheel to which the rim is applied. The end edges of the side flanges 8 and 10 are mitered adjacent the lock plate 16 so as to facilitate removal or disconnection of the complemental rim section 6 from the main rim section 5 and prevent outward displacement of the complemental rim section when the latter is in its normal or operative position.

In applying a tire to the rim, the complemental section 6 is first detached from the main rim section 5. The tire is then placed on the main section 5 in the usual manner. After placement of the tire on the rim section 5, the complemental section 6 is connected to the rim section 5 by inserting the tongues 11 through the openings 12 and then shifting, the section 6 towards the section 5 in order to insert the outer ends of the tongues 11 into the sockets 14 and bring the end edge of the base 9 into abutting relation with the contiguous or adjoining end edge of the base of the main section 5. After effecting connection of the tongue-equipped end of the complemental rim section 6 and the adjoining end of the main rim section 5, the other end of the complemental rim section is shifted outwardly until it is arrested by abutment of the outer or distal end of the lock plate 16 against the inner face of the base 7. The complemental rim section is locked in place by shifting the latch member 17 into locked relation with the outer contiguous end of the lock plate 16.

Removal of the tire from the rim is effected by releasing the latch member 17 and then disconnecting the complemental rim section 6 from the main rim section 5 by swinging it inwardly and manipulating it so as to withdraw the tongues 11 from the sockets 14.

The herein disclosed rim consists of but a small number of parts and therefore may be manufactured at a low and reasonable cost. By virtue of the fact that provision is made for bodily disconnecting the complemental rim section 6 from the main rim section, application and removal of the tire is facilitated.

The invention is not to be understood as restricted to the details set forth, since these may be modified within the scope of the appended claim, without departing from the spirit and scope of the invention.

Having thus described the invention, what I claim as new and desire to secure by Letters Patent, is:

A demountable rim comprising a main rim section having tire-retaining flanges at the sides thereof, a complemental rim section also having tire-retaining flanges at the sides thereof and extending between the ends of the main rim section and adapted to complete the rim, one of the sections having in one end thereof a pair of laterally spaced openings and a pair of open-ended sockets disposed inwardly of and facing the openings, the other section having at the contiguous end thereof a pair of laterally spaced outwardly extending tongues arranged to extend through the openings and to fit slidably in the sockets so as to form a pair of detachable connections whereby the complemental rim section may be removed bodily from the main rim section, said tongue and socket connections being disposed at opposite sides of the central parts of the rim-sections and in close proximity to the tire-retaining flanges and coacting with one another to prevent lateral rocking of the complemental rim-section relatively to the main rim-section, and releasable locking means between the other ends of the two sections.

Signed at Chicago, Illinois, this 10th day of April, 1931.

AARON BROWN.